United States Patent
Zhang et al.

(10) Patent No.: US 12,219,544 B2
(45) Date of Patent: *Feb. 4, 2025

(54) MULTI-TRP BEAM INDICATION USING TCI STATE

(71) Applicant: Apple Inc., Cupertino, CA (US)

(72) Inventors: Yushu Zhang, Beijing (CN); Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Oghenekome Oteri, San Diego, CA (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/754,575

(22) PCT Filed: Apr. 6, 2021

(86) PCT No.: PCT/CN2021/085605
§ 371 (c)(1),
(2) Date: Apr. 6, 2022

(87) PCT Pub. No.: WO2022/213251
PCT Pub. Date: Oct. 13, 2022

(65) Prior Publication Data
US 2024/0072869 A1   Feb. 29, 2024

(51) Int. Cl.
*H04W 72/044* (2023.01)
*H04B 7/06* (2006.01)
(Continued)

(52) U.S. Cl.
CPC ........ *H04W 72/046* (2013.01); *H04B 7/0695* (2013.01); *H04L 5/0035* (2013.01);
(Continued)

(58) Field of Classification Search
CPC ............. H04W 72/046; H04W 72/232; H04W 72/1289; H04W 72/042; H04W 72/1268;
(Continued)

(56) References Cited

U.S. PATENT DOCUMENTS

| 2019/0297603 A1 | 9/2019 | Guo et al. |
| 2020/0145062 A1 | 5/2020 | Jung et al. |

(Continued)

FOREIGN PATENT DOCUMENTS

| WO | 2021/006662 | 1/2020 |
| WO | WO 2022/051930 A1 * | 3/2022 |

OTHER PUBLICATIONS

Samsung, "MAC CE design for support of multiple beam indication for single", 3GPP TSG-RAN WG2 Meeting #107bis, R2-1912514, Oct. 18, 2019, 7 sheets.

(Continued)

*Primary Examiner* — Rushil P. Sampat
(74) *Attorney, Agent, or Firm* — Fay Kaplun & Marcin, LLP

(57) ABSTRACT

A user equipment (UE) is configured to use multiple beams for transmission or reception. The UE receives, from a base station, at least one medium access control (MAC) control element (CE) that indicates multiple activated transmission configuration indicator (TCI) states, receives, from the base station, at least one downlink control information (DCI) indicating a subset of TCI states of the multiple activated TCI states, wherein the MAC CE and the DCI are part of a TCI configuration, and wherein the subset of TCI states corresponds to multiple transmission and reception points (Continued)

(TRPs) of a wireless network, maps the subset of TCI states to the corresponding multiple TRPs based on the TCI configuration and selects a beam used for transmission or reception based on one mapped TCI state of the mapped subset of TCI states.

12 Claims, 7 Drawing Sheets

(51) Int. Cl.
    *H04L 5/00*          (2006.01)
    *H04W 72/232*    (2023.01)

(52) U.S. Cl.
    CPC .......... *H04L 5/0048* (2013.01); *H04L 5/0053* (2013.01); *H04W 72/232* (2023.01)

(58) Field of Classification Search
    CPC ..... H04W 72/21; H04W 72/23; H04W 76/27; H04B 7/0695; H04B 7/0404; H04L 5/0035; H04L 5/0048; H04L 5/0053; H04L 5/0023; H04L 5/0094
    See application file for complete search history.

(56) References Cited

U.S. PATENT DOCUMENTS

| | | |
|---|---|---|
| 2020/0344791 A1 | 10/2020 | Park et al. |
| 2021/0195624 A1* | 6/2021 | Venugopal ........... H04B 7/0695 |
| 2021/0337525 A1* | 10/2021 | Rahman ................ H04L 5/0094 |
| 2022/0217695 A1* | 7/2022 | Liou ..................... H04B 7/0695 |
| 2022/0399983 A1* | 12/2022 | Muruganathan ...... H04L 5/0098 |
| 2023/0291525 A1* | 9/2023 | Zhou ..................... H04L 5/0023 |
| 2023/0300604 A1* | 9/2023 | Zhou ..................... H04B 7/0628 |
| | | 370/328 |
| 2024/0080843 A1* | 3/2024 | Muruganathan ...... H04W 72/20 |
| 2024/0089943 A1* | 3/2024 | Yu ......................... H04L 5/0055 |

OTHER PUBLICATIONS

Motorola Mobility et al., "UE Power Saving in MIMO operation", 3GPP TSG RAN WG1 NR #95, r1-1813358, Nov. 16, 2018, 3 sheets.

* cited by examiner

MULTI-TRP BEAM INDICATION USING TCI STATE

BACKGROUND

In 5G new radio (NR) wireless communications, the 5G NR network may utilize multi transmission and reception points (TRP) to improve reliability of the wireless channels. For example, multiple PDSCHs (e.g., two PDSCHs) may be scheduled for user equipment (UE) reception via multi-TRPs to improve the throughput of the UE.

When establishing the network connection to the 5G NR network, a g-NodeB (gNB) transmits downlink control information (DCI) to the UE via a physical downlink control channel (PDCCH). The PDCCH is transmitted to the UE via one or more control resource sets (CORESETS), each of which includes a transmission configuration indicator (TCI) state configured by the gNB.

SUMMARY

Some exemplary embodiments are related to a processor of a user equipment (UE) configured to perform operations. The operations include receiving, from a base station, at least one medium access control (MAC) control element (CE) that indicates multiple activated transmission configuration indicator (TCI) states, receiving, from the base station, at least one downlink control information (DCI) indicating a subset of TCI states of the multiple activated TCI states, wherein the MAC CE and the DCI are part of a TCI configuration, and wherein the subset of TCI states corresponds to multiple transmission and reception points (TRPs) of a wireless network, mapping the subset of TCI states to the corresponding multiple TRPs based on the TCI configuration and selecting a beam used for transmission or reception based on one mapped TCI state of the mapped subset of TCI states.

Other exemplary embodiments are related to a processor of a base station configured to perform operations. The operations include transmitting, to a user equipment (UE), at least one medium access control (MAC) control element (CE) that indicates multiple activated TCI states, transmitting, to the UE, at least one downlink control information (DCI) indicating a subset of TCI states of the multiple activated TCI states, wherein the MAC CE and the DCI are part of a TCI configuration, and wherein the subset of TCI states corresponds to multiple transmission and reception points (TRPs) of a wireless network and wherein the UE maps the subset of TCI states to the corresponding multiple TRPs based on the TCI configuration, and wherein the UE selects a beam used for transmission or reception based on one mapped TCI state of the mapped subset of TCI states.

Still further exemplary embodiments are related to a user equipment (UE) having a transceiver configured to communicate with a network and a processor communicatively coupled to the transceiver and configured to perform operations. The operations include receiving, from a base station of the network, at least one medium access control (MAC) control element (CE) that indicates multiple activated transmission configuration indicator (TCI) states, receiving, from the base station, at least one downlink control information (DCI) indicating a subset of TCI states of the multiple activated TCI states, wherein the MAC CE and the DCI are part of a TCI configuration, and wherein the subset of TCI states corresponds to multiple transmission and reception points (TRPs) of a wireless network, mapping the subset of TCI states to the corresponding multiple TRPs based on the TCI configuration and selecting a beam used for transmission or reception based on one mapped TCI state of the mapped subset of TCI states.

Additional exemplary embodiments are related to a base station having a transceiver configured to communicate with a user equipment (UE) and a processor communicatively coupled to the transceiver and configured to perform operations. The operations include transmitting, to the UE, at least one medium access control (MAC) control element (CE) that indicates multiple activated TCI states, transmitting, to the UE, at least one downlink control information (DCI) indicating a subset of TCI states of the multiple activated TCI states, wherein the MAC CE and the DCI are part of a TCI configuration, and wherein the subset of TC states corresponds to multiple transmission and reception points (TRPs) of a wireless network, and wherein the UE maps the subset of TCI states to the corresponding multiple TRPs based on the TCI configuration, and wherein the UE selects a beam used for transmission or reception based on one mapped TCI state of the mapped subset of TCI states.

DETAILED DESCRIPTION

Figure 1:
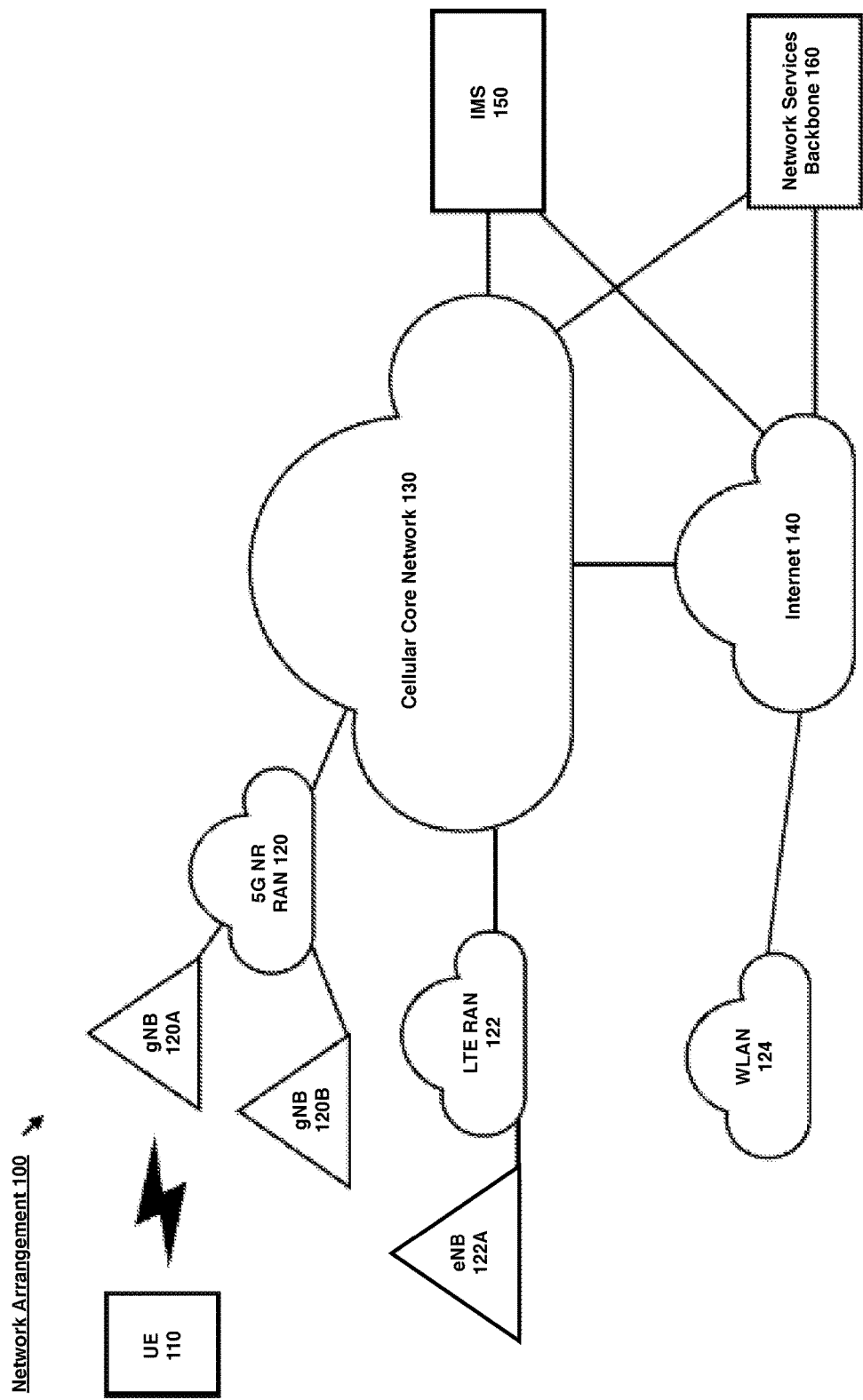
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to a user equipment (UE) receiving a transmission configuration indicator (TCI) configuration including multiple TCI states and mapping the TCI states to corresponding channels based on a received mapping configuration.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component.

In addition, the exemplary embodiments are described with regard to a 5G New Radio (NR) network. However, reference to a 5G NR network is merely provided for illustrative purposes. The exemplary embodiments may be utilized with any network that implements the functionalities described herein for edge computing. Therefore, the 5G NR network as described herein may represent any network that includes the functionalities associated with edge computing.

Release 17 of 5G NR supports a unified TCI framework that includes downlink (DL) TCI, uplink (UL) TCI, or joint DL/UL TCI beam indications for physical downlink shared channel (PDSCH), physical downlink control channel (PDCCH), physical uplink shared channel (PUSCH), and physical uplink control channel (PUCCH) transmissions over all component carriers (CCs) in a frequency band or band group. However, no support is defined for the provision of multiple TCI states with an indication of their correspondence to multiple TRPs.

According to the exemplary embodiments, a next generation NodeB (gNB) of a 5G NR network configures a UE with multiple TCI states corresponding to multiple TRPs. In addition, the gNB configures a mapping of the multiple TCI states to repetitions of a physical downlink shared channel (PDSCH), physical downlink control channel (PDCCH), physical uplink shared channel (PUSCH), and physical uplink control channel (PUCCH), channel state information reference signal (CSI-RS), or sounding reference signal (SRS) transmission. Based on the TCI configuration and the mapping configuration, the UE may update the beam used for transmission/reception based on the TCI corresponding to a TRP.

FIG. 1 shows an exemplary network arrangement 100 according to various exemplary embodiments. The exemplary network arrangement 100 includes a UE 110. It should be noted that any number of UE may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. The gNBs 120A and 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UE. During operation, the UE 110 may be within range of a plurality of gNBs. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
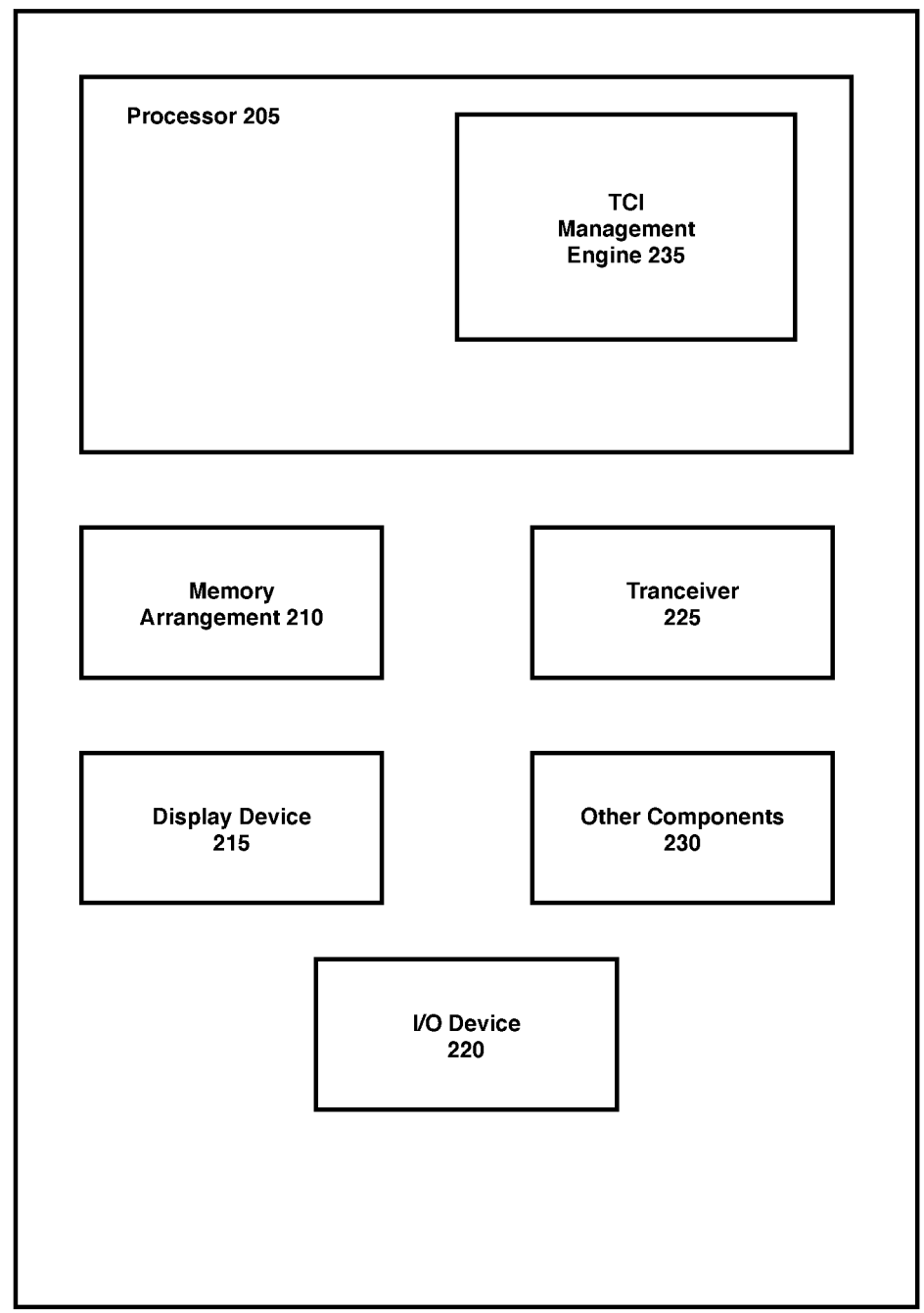
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a TCI management engine 235. The TCI management engine 235 may perform various operations related to receiving a TCI configuration having multiple TCI states corresponding to multiple TRPs, mapping the multiple TCI states to repetitions of a signal, and updating the beam to the TCI corresponding to one of the TRPs.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
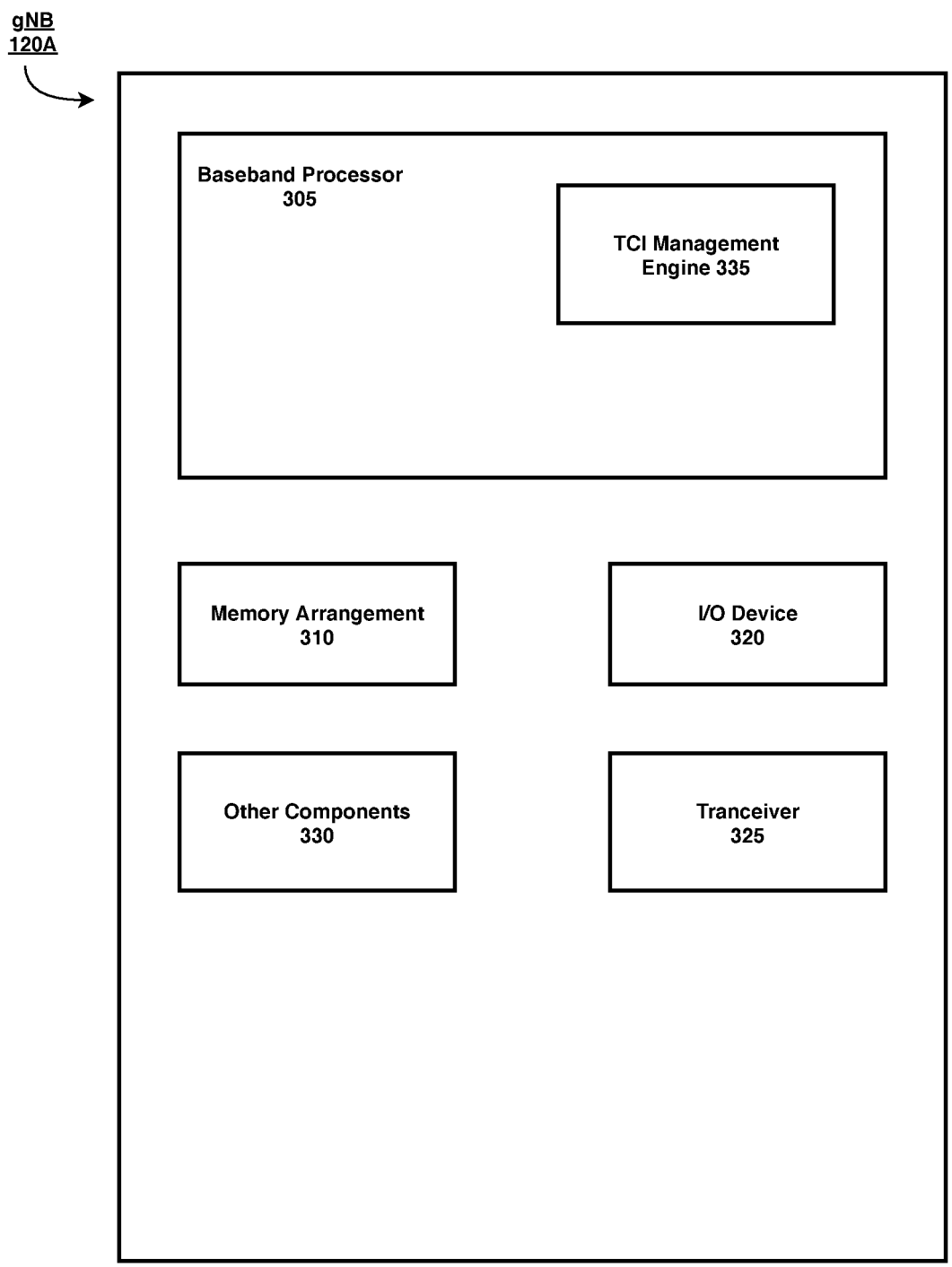
FIG. 3 shows an exemplary base station according to various exemplary embodiments.

FIG. 3 shows an exemplary network cell, in this case gNB 120A, according to various exemplary embodiments. The gNB 120A may represent any access node of the 5G NR network through which the UEs 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include a TCI management engine 335 for performing operations including configuring multiple TCI states corresponding to multiple TRPs and configuring a mapping of the TCI states to repetitions of a signal (e.g., PDSCH, PDCCH, PUSCH, PUCCH, CSI-RS, SRS). Examples of this process will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4:
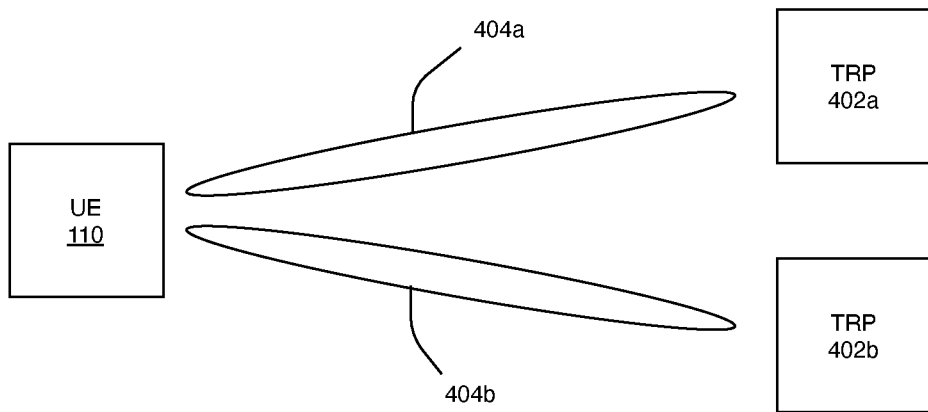
FIG. 4 shows a diagram illustrating an exemplary UE communicating with multiple transmission and reception point (TRPs) according to various exemplary embodiments.

FIG. 4 shows a diagram illustrating an exemplary UE (110) communicating with multiple transmission and reception point (TRPs) 402a, 402b according to various exemplary embodiments. It should be noted that although FIG. 4 illustrates two (2) TRPs, any reference to two (2) TRPs with regards to FIG. 4 or the following description is only exemplary and the network 100 may include any number of TRPs. Reference to two TRPs is for purposes of simplicity. As illustrated in FIG. 4, the UE 110 may communicate with a first TRP 402a via a first beam 404a and with a second TRP 402b over a second beam 404b. Each beam is associated with a TCI state. It should be noted that although the first and second TRPs 402a, 402b are illustrated as two distinct and separate entities, the first and second TRPs 402a, 402b may alternatively be two antenna panels at the same location. In addition, although the following description focuses on TCI states, the following description may also apply to sounding reference signal (SRS) resource indicators (SRIs), on which the beams for PUSCH transmissions are based.

Figure 5:
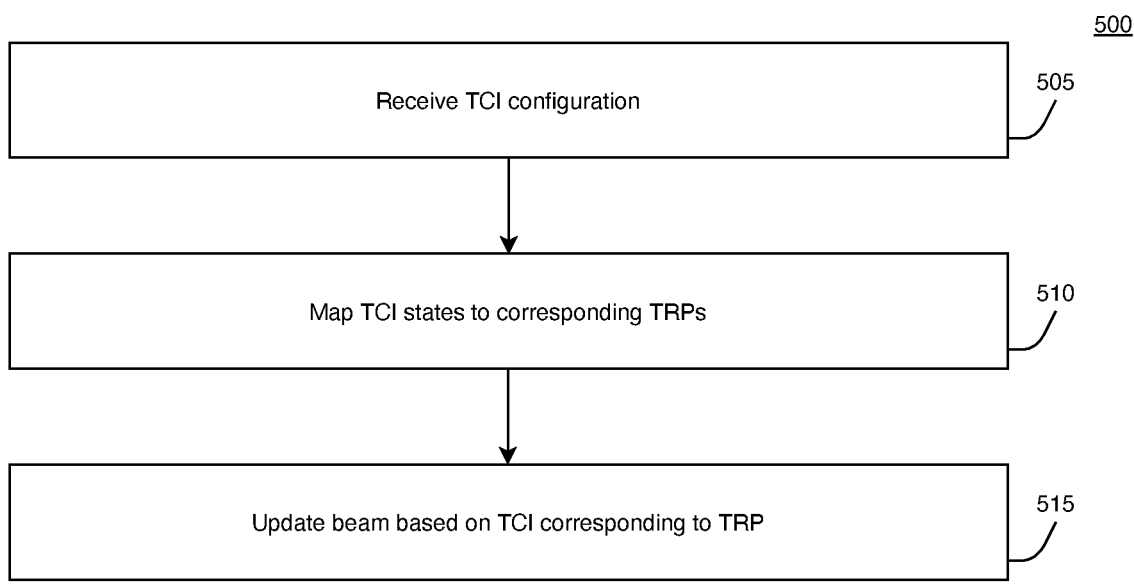
FIG. 5 shows a method of determining a transmission configuration indicator (TCI) state for multi-TRP operation according to various exemplary embodiments.

FIG. 5 shows a method 500 of determining a TCI state for multi-TRP operation according to various exemplary embodiments. The method 500 will additionally be described with reference to FIGS. 6A-6C, which show exemplary medium access control (MAC) control elements (CEs) for configuring multiple TCI states according to various exemplary embodiments, and FIGS. 6A-6D, which show diagrams depicting a configuration of multiple TCI states according to various exemplary embodiments.

At 505, the UE 110 receives a TCI configuration from the gNB 120A (or 120B). In some embodiments, the TCI configuration includes at least one medium access control (MAC) control element (CE) transmission (e.g., MAC CEs 600a-c illustrated in FIGS. 6A-6C, respectively) that activates a plurality of TCI states, each of which corresponds to a TRP, and at least one downlink control information (DCI) transmission that selects two TCI states activated by the MAC CE that correspond to two TRPs.

Figure 6A:
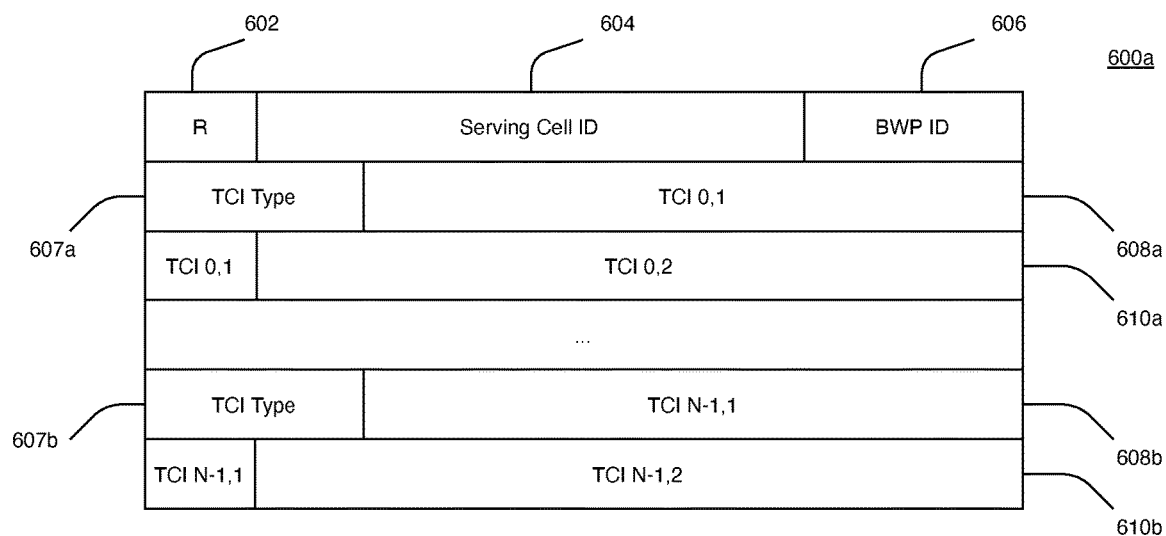
FIGS. 6A-6C shows exemplary medium access control (MAC) control elements (CEs) for configuring multiple TCI states according to various exemplary embodiments.

In some embodiments, the MAC CE transmission may include a MAC CE 600a, as illustrated in FIG. 6A, which activates more than one TCI state of the same type (DL, UL, or joint DL/UL). The exemplary MAC CE 600a may include a reserved bit field 602, a serving cell ID field 604, and a bandwidth part (BWP) ID 606. In addition, for each activated TCI state, the MAC CE 600a may include TCI type fields 607a, 607b that indicate whether the corresponding TCI states are UL, DL, or joint and activated TCI state fields 608a,b and 610a,b. As illustrated in FIG. 6A, the exemplary format of the TCI state fields 608a,b and 610a,b is TCI x,y, which represents the $y^{th}$ TCI corresponding to codepoint x of the DCI.

Figure 7A:
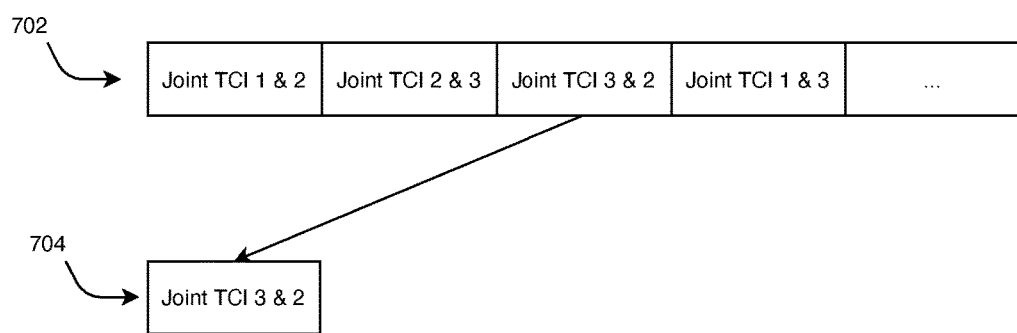
FIGS. 7A-7D show diagrams depicting a configuration of multiple TCI states according to various exemplary embodiments.

An example of a plurality of TCI states 702 activated by the MAC CE 600a is illustrated in FIG. 7A, which depicts the plurality of TCI states 702 as joint TCI states. It should be noted that the plurality of TCI states may alternatively be DL or UL. The DCI transmission includes a TCI codepoint that is mapped to one of the activated TCI states. Because the activated TCI states are of the same type (e.g., joint, UL, DL), one codepoint may be mapped to two TCI states since each field includes two TCI states. In the example illustrated in FIG. 7A, the TCI codepoint is 2 (e.g., where each block of TCI states is numbered from left to right as 0, 1, 2, 3, . . . ). As such, the selected TCI state 704 corresponds to joint TCI 3 and joint TCI 2, which correspond to two TRPs.

Figure 7B:
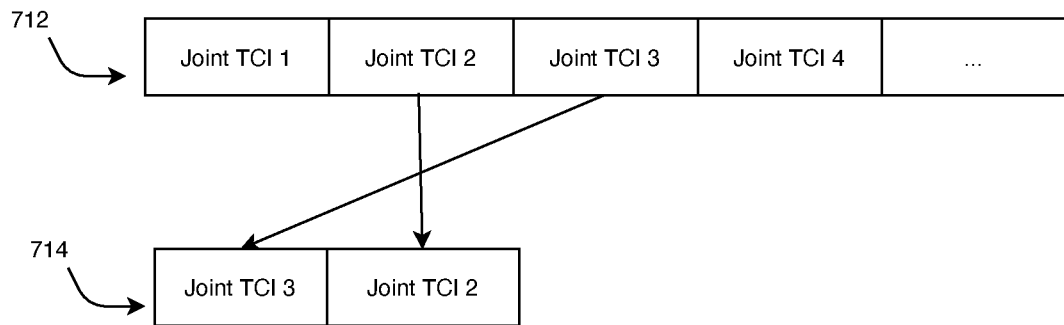

In some embodiments, the MAC CE may alternatively activate single TCI states 712 (one TCI state per field), as depicted in FIG. 7B. In some embodiments, the DCI may include two TCI codepoints (e.g., TCI codepoint 1 and TCI codepoint 2), each of which provides a TCI indication for a corresponding one of the two TRPs. In the example illustrated in FIG. 7B, the first TCI codepoint has a value of 2 and the second TCI codepoint has a value of 1. As a result, the selected TCI states 714 correspond to joint TCI 3 and joint TCI 2, which correspond to two TRPs.

In some embodiments, one DCI may indicate the TCI state corresponding to one TRP. In such an embodiment, one search space (SS) or control resource set (CORESET) (or two linked SSs/CORESETs) updates the beam corresponding to a TRP. A TRP index (e.g., TRP ID 612 of MAC CE 600*b* as will be described in greater detail below) may be configured by higher layer signaling (e.g., RRC) or may be determined based on a TRP index of the corresponding SS/CORESET (from the PDCCH).

Figure 6B:
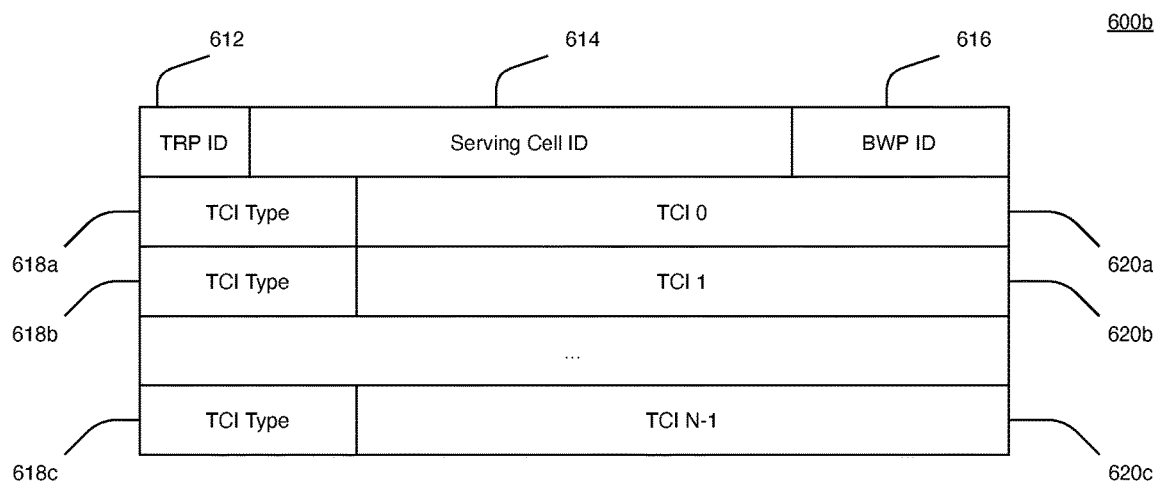

In some embodiments, the TCI configuration may include two DCI transmissions configured to indicate the TCI states corresponding to two TRPs. In such an embodiment, the TCI configuration may include two MAC CE transmissions, each of which includes a MAC CE 600*b*, as illustrated in FIG. 6B. In some embodiments, the MAC CE 600*b* includes a TRP ID field 612 to identify which TRP the MAC CE corresponds to, a serving cell ID 614, and a BWP ID 616. In addition, the MAC CE 600*b* includes TCI type fields 618*a-c* that indicate whether the corresponding TCI states 620*a-c* are UL, DL, or joint.

Figure 7C:
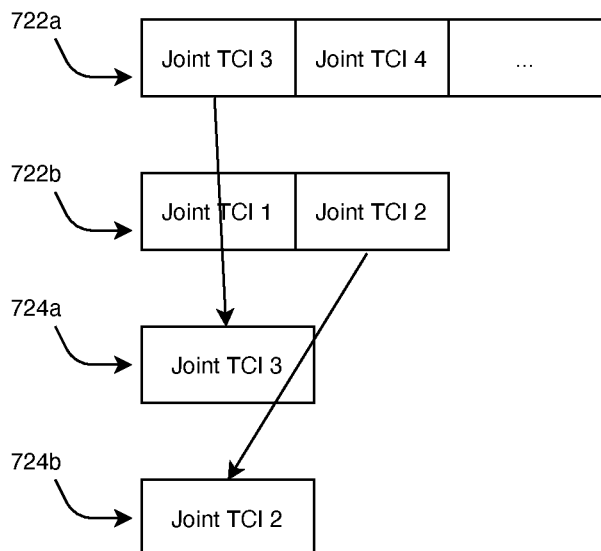

An example of the TCI states activated by two MAC CEs is depicted in FIG. 7C, which shows a first plurality of TCI states 722*a* activated by a first MAC CE and a second plurality of TCI 722*b* states activated by a second MAC CE. Each of the two DCIs selects one of the activated TCI states from one of the two MAC CEs. In the example illustrated in FIG. 7C, the first DCI includes a TCI codepoint with a value of 0 and the second DCI includes a TCI codepoint with a value of 1. As a result, the selected TCI state 724*a* from the first MAC CE is joint TCI 3 and the selected TCI state 724*b* from the second MAC SE is joint TCI 2.

Figure 6C:
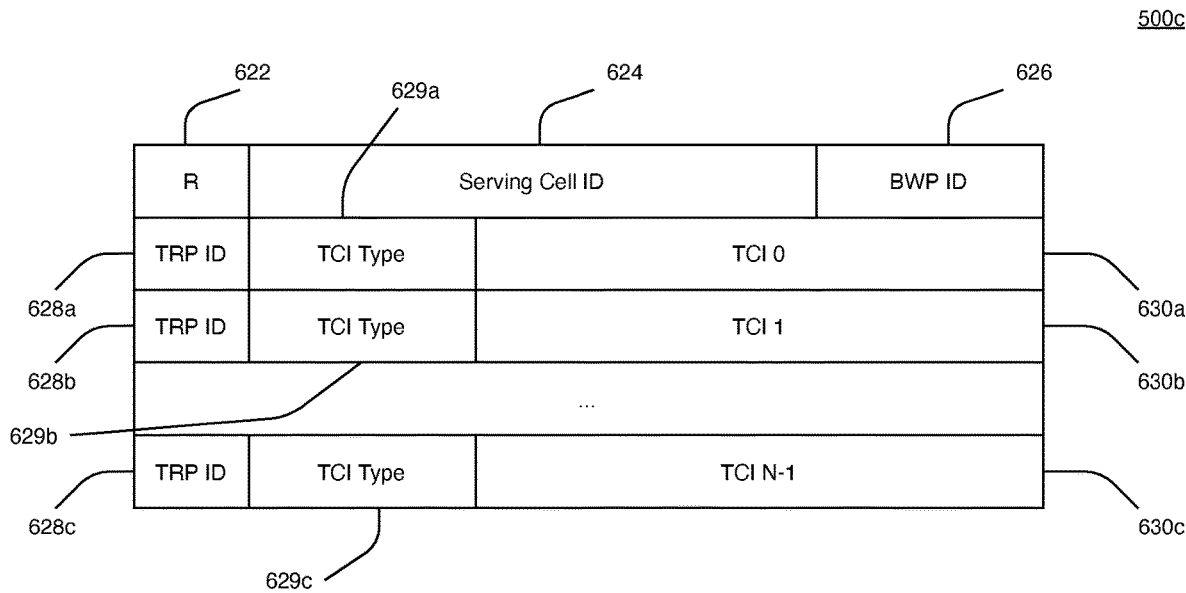

Alternatively, two DCIs may be used to select activated TCI states from a single MAC CE. For example, a MAC CE 600*c*, as depicted in FIG. 6C, may include a reserved field 622, a serving cell ID field 624, and a BWP field 626. In addition, each TCI entry includes a TRP ID field 628*a-c* to identify the TRP to which the TCI state corresponds, a TCI type field 629*a-c* to indicate the type of TCI (UL, DL, joint), and a TCI state field 630*a-c*.

Figure 7D:
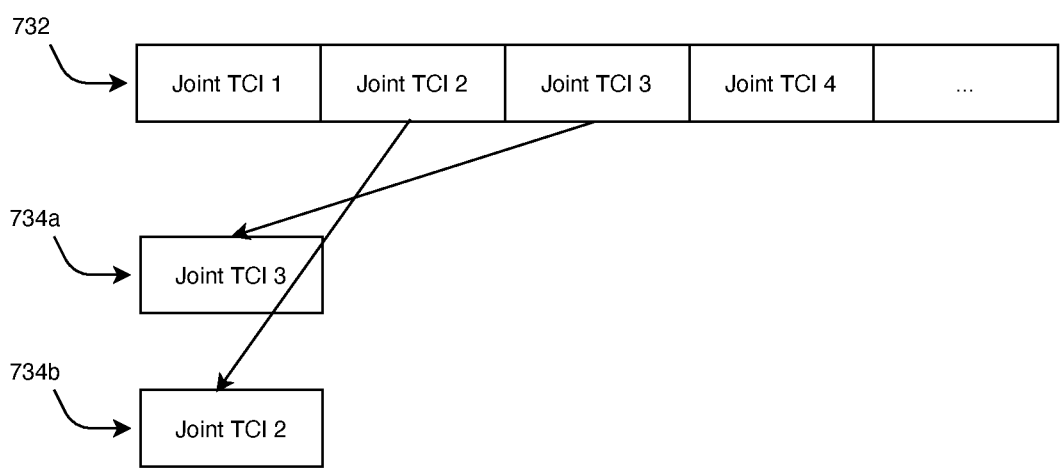

An example of two DCIs selecting TCI states from a single MAC CE is illustrated in FIG. 7D, which shows a plurality of activated TCI states 732. In the example illustrated in FIG. 7D, the first DCI includes a TCI codepoint with a value of 2 and the second DCI includes a TCI codepoint with a value of 1. As a result, the first selected TCI state 734*a* is joint TCI 3 and the second selected TCI state 734*b* is joint TCI 2. In some embodiments, one TCI codepoint may be mapped to one UL TCI state and/or one DL TCI state corresponding to one TRP. In some embodiments, one TCI codepoint may alternatively be mapped to one joint TCI state (as shown in FIG. 7D) corresponding to one TRP.

In some embodiments, the TCI configuration received at 505 includes a mapping configuration. The mapping configuration depends on the type of transmission (e.g., PDSCH, PDCCH, PUSCH, PUCCH, CSI-RS, SRS). In some scenarios, the TCI states indicated/selected by the TCI codepoint(s) of the DCI(s) discussed above are mapped to repetitions of these transmissions. However, current mapping rules always begin by mapping the first TCI state to the first repetition in the case of time division multiplexing (TDM), to the first precoding resource block group (PRG) in the case of frequency division multiplexing (FDM), or to the first code division multiplexing (CDM) group in the case of spatial division multiplexing (SDM).

For PDSCH transmissions, in some embodiments, the mapping configuration includes a dynamic swapping to address this issue. The dynamic swapping may be indicated in the scheduling PDCCH. For example, in some embodiments, an additional field can be added to DCI Format 1_1/1_2 transmissions to indicate which TCI state the mapping should begin with. When the field has a first value, the mapping is indicated as {TCI 0, TCI 1}. Conversely, when the field has a second value, the mapping is indicated as {TCI 1, TCI 0}. In some embodiments, the mapping may alternatively be jointly coded with some other field such as, for example, the TCI state field, a frequency domain resource allocation (FDRA) field, a time domain resource allocation (TDRA) field, or an antenna port(s) field.

For dynamic grant (DG)-PUSCH transmissions, in some embodiments, the mapping configuration includes a dynamic swapping indicated in the scheduling PDCCH. For example, in some embodiments, an additional field can be added to DCI Format 1_1/1_2 transmissions to indicate which SRI the mapping should begin with. When the field has a first value, the mapping is indicated as {SRI 0, SRI 1}. Conversely, when the field has a second value, the mapping is indicated as {SRI 1, SRI 0}. In some embodiments, the mapping may alternatively be jointly coded with some other field such as, for example, the SRI field, a transmitted precoding matrix indicator (TPMI) field, or a TDRA field. For example, some fields for the second TPMI may be used to indicate the SRI mapping order. For configured grant (CG)-PUSCH transmissions, the mapping configuration may include a swapping configured by the gNB 120A via RRC signaling.

For PUCCH transmissions, in some embodiments, the mapping configuration a swapping configured by the gNB 120A via RRC signaling or a MAC CE. For aperiodic PUCCH transmissions, the swapping may be indicated by the scheduling DCI in a similar manner as discussed above with respect to PDSCH and DG-PUSCH transmissions.

Because a CORESET cannot be divided into CORESET pools for single-DCI multi-TRP operation, in some embodiments, the mapping configuration includes a configuration by the gNB 120A of the TRP index corresponding to the CORESET via higher layer signaling (e.g., RRC, MAC CE). In some embodiments, the mapping configuration may alternatively be based on a determination of the TRP index based on a CORESET ID. For example, when the gNB 120A configures a plurality of TRPs via higher layer signaling, the first N/2 (rounded up to the nearest integer) CORESETs are associated with the first TRP and the remaining CORESETs are associated with the second TRP. N represents the total number of CORESETs configured for a component carrier (CC). The UE 110 then maps the first and second TCI states to the CORESETs corresponding to the first and second TRPs. In the case of CORESETs with two linked SSs for PDCCH repetitions, in some embodiments, the first SS corresponds to the first TRP and the second SS corresponds to the second TRP.

Because only a single TCI or spatial relation can be configured for CSI-RS/SRS transmissions, in some embodiments, the mapping configuration includes a configuration by the gNB 120A of the TRP index corresponding to the CSI-RS/SRS resource/resource set via higher layer signaling (e.g., RRC, MAC CE). In some embodiments, the mapping configuration may alternatively be based on a determination of the TRP index based on a CSI-RS/SRS resource/resource set ID. For example, when the gNB 120A configures a plurality of TRPs via higher layer signaling, the first N/2 (rounded up to the nearest integer) CSI-RS/SRS resource/resource sets are associated with the first TRP and the remaining resource/resource sets are associated with the second TRP. N represents the total number of resource/resource sets configured for a component carrier (CC). The UE 110 then maps the first and second TCI states to the CSI-RS/SRS resource/resource sets corresponding to the first and second TRPs. In some embodiments, this determination is made based on a functionality associated with the resource/resource set. That is, the resource/resource sets are counted based on functionality (CSI-RS for CSI acquisition, CSI-RS for tracking, CSI-RS for beam management, SRS for codebook, SRS for non-codebook, SRS for beam management, SRS for antenna switching, and SRS for positioning).

Returning to FIG. 5, at 510, the UE 110 maps the first and second TCI states to the corresponding first and second TRPs (e.g., the signals transmitted to or received from the TRPs) based on the mapping configuration. At 515, the UE 110 updates (switches) the beam from a current beam being used to the beam associated with the indicated TCI state corresponding to one of the TRPs. In some embodiments, the UE 110 may select the same beam currently being used.

EXAMPLES

In a first example, a base station comprising a transceiver configured to communicate with a user equipment (UE), and a processor communicatively coupled to the transceiver and configured to perform operations comprising transmitting, to the UE, at least one medium access control (MAC) control element (CE) that indicates multiple activated TCI states, transmitting, to the UE, at least one downlink control information (DCI) indicating a subset of TCI states of the multiple activated TCI states, wherein the MAC CE and the DCI are part of a TCI configuration, and wherein the subset of TCI states corresponds to multiple transmission and reception points (TRPs) of a wireless network, and wherein the UE maps the subset of TCI states to the corresponding multiple TRPs based on the TCI configuration, and wherein the UE selects a beam used for transmission or reception based on one mapped TCI state of the mapped subset of TCI states.

In a second example, the base station of the first example, wherein the at least one MAC CE is a single MAC CE and each of the multiple activated TCI states includes two TCI states, wherein the two TCI states are both one of downlink (DL) TCI states, uplink (UL) TCI states, or joint DL and UL TCI states, and wherein the at least one DCI transmission is a single DCI transmission having a TCI codepoint that indicates one of the multiple activated TCI states.

In a third example, the base station of the first example, wherein the at least one MAC CE is a single MAC CE, and wherein the at least one DCI transmission is a single DCI transmission having a first TCI codepoint that indicates a first one of the multiple activated TCI states and a second TCI codepoint that indicates a second one of the multiple activated TCI states.

In a fourth example, the base station of the first example, wherein the at least one MAC CE is two MAC CEs, and wherein the at least one DCI transmission is two DCI transmissions, wherein a first one of the two DCI transmissions includes a first TCI codepoint that indicates a first one of the multiple activated TCI states of a first one of the two MAC CEs and a second one of the two DCI transmissions includes a second TCI codepoint that indicates a second one of the multiple activated TCI states of a second one of the two MAC CEs.

In a fifth example, the base station of the first example, wherein the at least one MAC CE is a single MAC CE, and wherein the at least one DCI transmission is two DCI transmissions, wherein a first one of the two DCI transmissions includes a first TCI codepoint that indicates a first one of the multiple activated TCI states and a second TCI codepoint that indicates a second one of the multiple activated TCI states.

In a sixth example, the base station of the first example, wherein the TCI configuration includes an indication of an order the subset of TCI states to be mapped to corresponding physical downlink shared channel (PDSCH) transmissions.

In a seventh example, the base station of the first example, wherein the TCI configuration includes an indication of an order of sounding reference signal (SRS) resource indicators (SRIs) to be mapped to corresponding dynamic grant (DG)-physical uplink shared channel (PUSCH) CG-PUSCH transmissions or aperiodic physical uplink control channel (PUCCH) transmissions.

In an eighth example, the base station of the first example, wherein the TCI configuration is configured via higher layer signaling or a DCI transmission.

In a ninth example, the base station of the eighth example, wherein the higher layer signaling or the DCI transmission indicates a mapping configuration by jointly coding a mapping order with one or more fields of the higher layer signaling.

In a tenth example, the base station of the first example, wherein the TCI configuration includes a mapping of the subset of TCI states to a corresponding set of control resource sets (CORESETs) for physical downlink control channel (PDCCH) transmissions.

In an eleventh example, the base station of the first example, wherein the TCI configuration includes a mapping of the subset of TCI states to a corresponding set of channel state information (CSI) reference signal (RS) or sounding reference signal (SRS) resources or resource sets.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above-described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
   receiving, from a base station, at least one medium access control (MAC) control element (CE) that indicates multiple activated transmission configuration indicator (TCI) states;
   receiving, from the base station, at least one downlink control information (DCI) indicating a subset of TCI states of the multiple activated TCI states, wherein the MAC CE and the DCI are part of a TCI configuration, and wherein the subset of TCI states corresponds to multiple transmission and reception points (TRPs) of a wireless network, wherein the at least one MAC CE is a single MAC CE and each of the multiple activated TCI states includes two TCI states, wherein the two TCI states are both one of downlink (DL) TCI states, uplink (UL) TCI states, or joint DL and UL TCI states, and wherein the at least one DCI transmission is a single DCI transmission having a TCI codepoint that indicates one of the multiple activated TCI states;
   mapping the subset of TCI states to the corresponding multiple TRPs based on the TCI configuration; and
   selecting a beam used for transmission or reception based on one mapped TCI state of the mapped subset of TCI states.

2. The processor of claim 1, wherein the TCI configuration includes an indication of an order the subset of TCI states to be mapped to corresponding physical downlink shared channel (PDSCH) transmissions.

3. The processor of claim 1, wherein the TCI configuration includes an indication of an order of sounding reference signal (SRS) resource indicators (SRIs) to be mapped to corresponding dynamic grant (DG)-physical uplink shared channel (PUSCH) CG-PUSCH transmissions or aperiodic physical uplink control channel (PUCCH) transmissions.

4. The processor of claim 1, wherein the TCI configuration is configured by the base station of the wireless network via higher layer signaling or a DCI transmission.

5. The processor of claim 1, wherein the mapping configuration includes a mapping of the subset of TCI states to a corresponding set of control resource sets (CORESETs) for physical downlink control channel (PDCCH) transmissions.

6. The processor of claim 1, wherein the TCI configuration includes a mapping of the subset of TCI states to a corresponding set of channel state information (CSI) reference signal (RS) or sounding reference signal (SRS) resources or resource sets.

7. A processor of a base station configured to perform operations comprising:
   transmitting, to a user equipment (UE), at least one medium access control (MAC) control element (CE) that indicates multiple activated TCI states;
   transmitting, to the UE, at least one downlink control information (DCI) indicating a subset of TCI states of the multiple activated TCI states, wherein the MAC CE and the DCI are part of a TCI configuration, and wherein the subset of TCI states corresponds to multiple transmission and reception points (TRPs) of a wireless network, wherein the at least one MAC CE is a single MAC CE and each of the multiple activated TCI states includes two TCI states, wherein the two TCI states are both one of downlink (DL) TCI states, uplink (UL) TCI states, or joint DL and UL TCI states, and wherein the at least one DCI transmission is a single DCI transmission having a TCI codepoint that indicates one of the multiple activated TCI states; and
   wherein the UE maps the subset of TCI states to the corresponding multiple TRPs based on the TCI configuration, and
   wherein the UE selects a beam used for transmission or reception based on one mapped TCI state of the mapped subset of TCI states.

8. The processor of claim 7, wherein the TCI configuration includes an indication of an order the subset of TCI states to be mapped to corresponding physical downlink shared channel (PDSCH) transmissions.

9. The processor of claim 7, wherein the TCI configuration includes an indication of an order of sounding reference signal (SRS) resource indicators (SRIs) to be mapped to corresponding dynamic grant (DG)-physical uplink shared channel (PUSCH) CG-PUSCH transmissions or aperiodic physical uplink control channel (PUCCH) transmissions.

10. The processor of claim 7, wherein the TCI configuration is configured via higher layer signaling or a DCI transmission.

11. The processor of claim 10, wherein the higher layer signaling or the DCI transmission indicates a mapping configuration by jointly coding a mapping order with one or more fields of the higher layer signaling.

12. The processor of claim 7, wherein the TCI configuration includes a mapping of the subset of TCI states to a corresponding set of control resource sets (CORESETs) for physical downlink control channel (PDCCH) transmissions.

* * * * *